United States Patent [19]
Fields

[11] Patent Number: 6,087,419
[45] Date of Patent: Jul. 11, 2000

[54] OXIDIZED ALL-WEATHER CUTBACK ASPHALTS

[76] Inventor: John R. Fields, 2626 120th East, Sumner, Wash. 98309

[21] Appl. No.: 09/122,190

[22] Filed: Jul. 23, 1998

[51] Int. Cl.7 .................................................. C08L 95/00
[52] U.S. Cl. ................................................ 524/62
[58] Field of Search ............................... 524/62

[56] References Cited

U.S. PATENT DOCUMENTS

| | | | |
|---|---|---|---|
| 4,081,502 | 3/1978 | Blumel et al. | 524/62 |
| 4,148,780 | 4/1979 | Blumel et al. | 524/62 |
| 4,349,388 | 9/1982 | Marzocchi et al. | 106/281 |
| 4,898,617 | 2/1990 | Motomura et al. | 106/281.1 |
| 4,923,913 | 5/1990 | Chich et al. | 524/62 |
| 5,053,080 | 10/1991 | Gaidis | 106/278 |
| 5,236,497 | 8/1993 | Grzybowski | 106/282 |
| 5,336,438 | 8/1994 | Schilling et al. | 252/311.5 |
| 5,362,316 | 11/1994 | Paradise | 106/278 |
| 5,618,340 | 4/1997 | Krogh et al. | 106/284.06 |
| 5,622,554 | 4/1997 | Krogh et al. | 106/284.06 |

*Primary Examiner*—Peter A. Szekely
*Attorney, Agent, or Firm*—Garrison & Associates PS; Matthew J. Marquardt; David L. Garrison

[57] ABSTRACT

Fully oxidized cutback asphalts suitable for application in roofing, waterproofing, and sealing applications in all weather conditions, including as mastics and other sealants. Compositions according to the invention comprise unprecedented proportions of solids and asphalts yet remain workable to temperatures as low as 20° F. or below. In addition to fully-oxidized roofing-grade asphalts, preferred compositions according to the invention also comprise hydrophobic agents selected from the group comprising fatty acids and amine compounds and may be applied in rain or other wet conditions, and include polybutene to control the glass transition temperature of the completed mastic and thereby permit application of the composition at extremely low temperatures. Preferred embodiments optionally also comprise fillers such as cellulose fibers, diatomaceous earth, limestone, and asbestos for various advantageous purposes.

21 Claims, 2 Drawing Sheets

OXIDIZED ALL-WEATHER CUTBACK ASPHALTS

TECHNICAL FIELD

The invention relates to asphalt based waterproofing, roofing, and sealing compounds; more particularly, it relates to fully oxidized cutback asphalt mastics, coatings, and sealants suitable for application in all weather conditions.

BACKGROUND OF THE INVENTION

For centuries asphalt and other bituminous products have been used to provide waterproofing and protective coverings and coatings for roofs, foundations, and the like; resilient, weather resistant pavings; and sealants useful in a wide variety of applications. And for as long as asphalts have been used for such purposes it has been found necessary from time to time to repair the installations of which they form part. A particularly vexing annoyance has been that those times at which the need for repair is made most apparent, and at which the need for repairs is most sorely immediate, are those very times when it is both most difficult and least convenient to make them: for example, when it is raining and/or temperatures are below freezing. Both moisture and cool temperatures make it very difficult to apply or install asphalt compounds, including mastics and other asphalts used in the repair of existing roofs, because asphalts typically do not adhere to damp or wet surfaces and water and because they become highly viscous and even solid at reduced temperatures.

In addition, it has long been recognized that oxidizing the asphalts used in each of the above mentioned applications produces results far superior to those achieved by using unoxidized, straight-run or "flux" asphalts. Among other effects, the oxidization of asphalt raises its softening point— which in most roofing, sealing, and waterproofing applications is desirable. For example, it is desirable to use an asphalt having a softening point in excess of 100° F. on roofs exposed to warm summer sun, which can cause temperatures in the asphalt to exceed the typical 70° softening point of unoxidized asphalts by a considerable margin. Yet the oxidation of asphalt and the consequential elevation of its softening point aggravates the difficulty of applying the asphalt—with a higher softening point, the asphalt is even stiffer then before at any given temperature. In the past, the solution to the problem of repairing leaks in asphalt roofing installations in inclement weather, using mastics and the like, has been addressed, as best may be, through the mixing of straight-run (unoxidized) asphalts, with their inferior weather-resistant qualities and low softening points, with mineral spirits to form cutback asphalts. The mixing of asphalt with mineral spirit solvents to form cutback asphalts has the effect of lowering the softening point of the asphalt, so that it can be applied at relatively low temperatures without heating. Once the cutback has been installed, the mineral spirit cutback agent evaporates, leaving behind only the asphalt base, together with any other added non-volatile substances such as bulk and insulation fillers. Yet even the use of mineral spirit solvents as cutback agents can lower the softening point, or the viscosity, of an asphalt so far—at least, that is, when acceptable amounts of the solvent are used. In order to make most asphalt soft enough to be applied in cold temperatures, in excess of 60% mineral spirits (by weight) must typically be used, leaving a solids (asphalt) content of 40% or less. This reduces the solid (asphalt) content of the cutback to unacceptably low levels and reduces the viscosity, durability, and weather resistance of the residual asphalt coating. Indeed, mineral spirit cutback asphalts used today generally fail to meet accepted quality standards published by the American Society of Testing Materials (ASTM). The use of oxidized asphalts, with their elevated softening points and increased viscosity, has only aggravated the problem. Even more mineral spirits are used, leaving behind even less solids content having even worse residual properties. And neither cutback nor straight paving grade asphalts have greater affinity for water than any other asphalts, so that the use of such asphalts in wet conditions to repair, for example, leaky roofs has been unsatisfactory. Thus attempts to utilize the superior weather-resistant qualities available through the use of fully oxidized asphalts (sometimes called "air blown" asphalts in the industry) as bases for the cutback asphalts have consistently resulted in mixtures having either melting or softening points well above the point at which such asphalts can be effectively applied in cold temperatures or far too high a solvent content, or both.

Other attempts have been made. For example, U.S. Pat. No. 5,362,316 to Paradise discloses a composition comprising asphalt, coal tar, elastomers, and a terpene solvent; while U.S. Pat. Nos. 5,618,340 and 5,622,554 to Krogh et al. disclose a roof-coating compositions comprising alkodylated fatty amines and alkoxylated ether amine surfactants. None of these attempts, however, teaches a means for producing mastics, coatings, or sealants which enjoy the benefits of using oxidized asphalts.

Thus there exists a need for an asphalt roofing, waterproofing, and sealing compound enjoying the benefits of a fully oxidized asphalt base and suitable for use in cold weather and in damp or wet conditions, having acceptable viscosity over a broad range of temperatures and an acceptable solids content, and which meets accepted quality standards such as those published by the ASTM.

DISCLOSURE OF THE INVENTION

Accordingly, it is an object of the invention to provide an asphalt roofing, waterproofing, and sealing compound enjoying the benefits of a fully oxidized asphalt base and suitable for use in cold weather and in damp or wet conditions, having acceptable viscosity over a broad range of temperatures and an acceptable solids content, and which meets accepted quality standards such as those published by the ASTM. It is a further object of the invention to provide such an asphalt in the form of a mineral-spirit cutback. It is yet another object of the invention to provide such an asphalt in a form which is capable of realizing the further benefits of modification by the addition of rubber or other polymers, and by the addition of various fillers to improve sag, creep control, thermal insulation, and other properties in the finished cutback asphalt installation.

These and such other objects of the invention as will become evident from the disclosure below are met by the invention disclosed herein. The invention provides means and compositions for fully oxidized cutback asphalts, including mastics and other sealants, suitable for application in roofing, waterproofing, and sealing applications under all weather conditions. Compositions according to the invention comprise unprecedentedly high proportions of solids and asphalts content, yet remain workable to temperatures as low as 20° F. or below, and meet all applicable ASTM standards. In addition, asphalt compounds according to the invention are suitable for use with rubber- or other polymer-modified asphalt bases and benefit from the advantages or polymer modification.

In one aspect the invention provides a fully oxidized all-weather hydrophobic cutback asphalt capable of being applied to a substrate at an ambient temperature as low as approximately 20° F. without being heated. The cutback asphalt exhibits improved adherence to wet substrates, and comprises between about 60% and about 80% by weight fully oxidized asphalt having a softening point between about 110° F. and 140° F., between about 20% and about 40% by weight mineral spirits, at least ½% and preferably between about 1% and about 6% by weight polybutene, and optionally at least about ⅙% by weight of a hydrophobic agent selected from the group comprising fatty acids and amine compound.

The asphalt comprised by the composition serves as a major component in building the waterproofing, sealing, and protective coating of the invention. Any asphalt capable of being oxidized to a softening point in the specified range and consistent with the purposes stated herein will serve. For most applications, oxidized asphalts having a softening point of about 100° F. or more are adequate, but best results have been achieved by oxidizing the asphalt to a softening point of approximately 120° F., and these asphalts are preferred for use with the invention. The mineral spirits act as the primary cutback agent, keeping the asphalt from solidifying at typical ambient temperatures. Prior art cutback asphalts remain workable to temperatures as low as 50° F. or so, due primarily to the presence of the mineral spirits. In an attempt to make such cutbacks workable at temperatures much below 50° F., however, mineral spirit contents of 70% to 75% by weight, or even more, have proved necessary, and these contain an unacceptably low solid contents for general roofing, waterproofing, and sealing use. And none of the prior art compositions employ 100% oxidized asphalt bases, with its superior weather resistant possibilities. An asphalt content of about 60% to 80% and a cutback content of about 20% to about 40% by weight is preferred because the viscosities of cutbacks in this composition range exhibit viscosities which facilitate the making of superior asphalt coating layers. When too little cutback agent is present the asphalt is unworkably stiff at most desired temperature ranges, and when too much cutback agent is present the asphalt has too low a viscosity when applied to permit formation of an adequate coating.

It is only by means of the improvements stated herein that cutbacks useable at 20° F. and below are possible; and this is especially so in the case of cutbacks having fully oxidized asphalt bases. The improvement is chiefly accomplished by the addition to cutback asphalts of significant amounts of polybutene, which may be described as a plasticizer. It has been found that the addition to cutback asphalts of small amounts of polybutene affects the glass transition characteristics of the asphalt, lowering the viscosity of the cutback at low temperatures and raising the viscosity at high temperatures, both of which are extremely beneficial in cutback asphalts, as they are easier to apply and more durable and less prone to sagging or creeping and other environmentally-induced effects once installed. It has been found that the benefits derived from the addition of polybutene are optimized by adding between about 1% and about 6% polybutene having an average molecular weight (MN) of between about 900 and about 2500, a viscosity at 100° F. of between about 8,000 and about 150,000 cSt, and a density of between about 7.4 and about 7.6 pounds per gallon (US); and most preferably about 2% to about 3% polybutene having an average molecular weight of about 1,300, a viscosity at 100° F. of about 27,230 cSt, and a density of about 7.47 pounds per gallon (US). Adding too little polybutene has been found to have an inadequate effect on the glass transition characteristics of the cutback asphalt to achieve the beneficial results described, and in particular too small an effect on reducing the viscosity of the asphalt at low temperatures. Adding too much has been found to lead to phase change and a breakdown in the process whereby the polybutene is absorbed in the cutback composition, having no additional useful effect on the glass transition characteristics beyond those provided by the mentioned preferred levels, and introducing sometimes unwanted excess compounds to the composition.

The optional addition to the cutback asphalt of a hydrophobic agent has the generally desirable effect of giving the cutback asphalt the characteristic of driving moisture away from itself without degrading the quality of the asphalt itself or of the resultant coating, which permits the cutback asphalt to be applied confidently in wet or rainy conditions. Preferred hydrophobic agents for use herein include fatty acids and amine compounds, which are believed to have the additional beneficial effect of aiding the introduction and incorporation of the polybutene plasticizer. Fatty acids preferred in making those compounds according to the invention which comprise rubber or polymer-modified asphalt bases, as it has found that the use of amine compounds tends to react with the polymer modifier, causing a phase separation after the finished product has been allowed to set for a time. Fatty acids have not been found to cause or encourage this phase separation. It has been found that the addition of about ⅙% to about ¾% by weight hydrophobic agent optimizes the hydrophobic benefits of the agent. In the case of amine compounds, the addition of too much hydrophobic agent has been observed in some conditions to actually increase the attraction of moisture to the asphaltic compound—that is, to impart to the compound a hydrophilic rather than a hydrophobic or water-repellent tendency. It is also observed that the addition of too much amine compound reduces the adhesiveness of the asphaltic compound, making it more difficult to install and reducing its effectiveness and its useful life.

As indicated, an especially advantageous aspect of the invention is that it permits the use of fully oxidized asphalt bases, in particular asphalts modified by the addition of rubber and other polymers, as for example styrene-ethylene-butylene-styrene (SEBS) block copolymer, styrene-butadiene-styrene (SBS) block copolymer, and atactic polypropylene (APP). As more fully explained in my patent applications Ser. No. 08/978,243, filed Nov. 25, 1997, and entitled "Styrene Ethylene Butylene Styrene (SEBS) Copolymer Rubber Modified Asphalt Mixture"; and Ser. No. 08/978,244, filed Nov. 25, 1997, and entitled "Plasticized Styrene Ethylene Butylene Styrene (SEBS) Copolymer Rubber Modified Asphalt Mixture," modified asphalts enjoy all of the advantages offered by unmodified asphalts, and many more, including increased resistance to thermal stresses, ozone, and ultraviolet radiation. Moreover, cutback asphalts according to the invention described herein may be produced by the methods and apparatus described herein in the same manner those containing nom-modified asphalts, without need for modifying the process or apparatus. The specifications for my SEBS modified asphalts are hereby incorporated in this specification, as if set out fully herein, to supplement the processes and explanations provided herein, and to support my teaching of the art of making polyester sheets coated with specially modified asphalts. It is preferred to use modified asphalts comprising from 1% to about 25% by weight styrene ethylene butylene styrene (SEBS) copolymer, and in particular between about 3% to about 5% SEBS, before addition of solvents and other additives.

It is also advantageous in many conditions to add various fillers to the cutback asphalts of the invention. Such fillers may include those selected from the group comprising cellulose fibers, diatomaceous earth, limestone, and asbestos. In addition to other properties contributed by specific fillers, fillers in general can, as will be understood by those having an ordinary familiarity with the art, be used to control or affect the viscosity, bulk and solids content of the finished cutback product, as well as fire ratings, thermal insulation characteristics, creep (or sag), and weather resistance. Cellulose, limestone, and diatomaceous earth are also especially useful for absorbing excess oils present in the asphalt. Many of these fillers, and especially limestone, are cost effective fillers, in that they are relatively inexpensive.

In adding cellulose fibers to the cutback asphalts of the invention, it has been found to be advantageous to prepare the cutback for addition of the cellulose by adding a quantity of a colloidal attapulgite clay gelling compound to aid suspension of the cellulose fibers in the cutback. In turn, dispersion of the colloidal attapulgite clay in said cutback asphalt is improved by the addition of an active cationic salt surfactant. Thus preferred embodiments of the invention comprise colloidal attapulgite clays and cationic salt surfactants.

BEST MODE OF CARRYING OUT THE INVENTION

Figure 1:
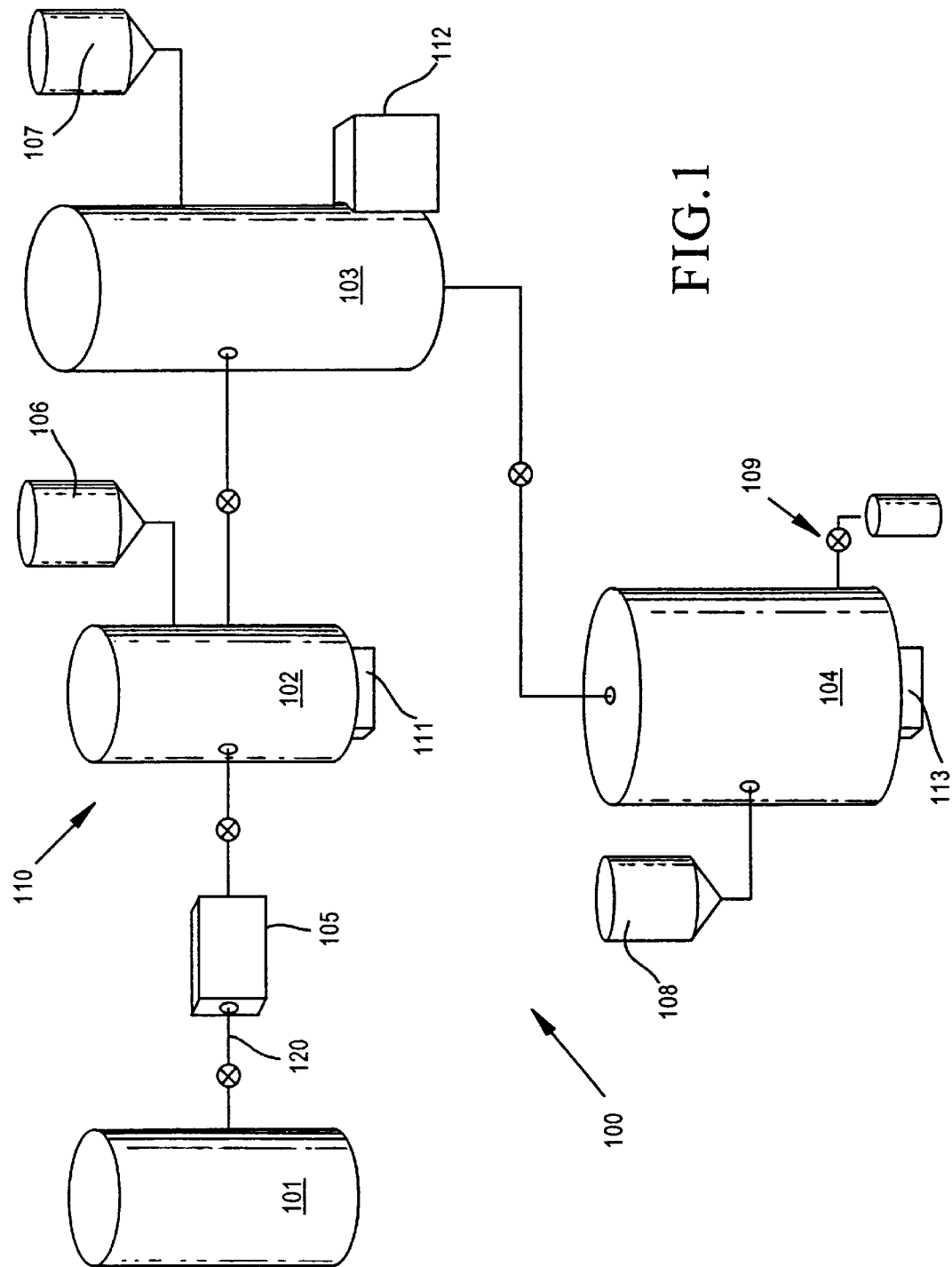
FIG. 1 is a schematic view of an apparatus for carrying out a preferred process for making fully-oxidized cutback asphalts according to the invention.

Asphalt, for the purposes of this disclosure, means any bituminous material or hydrocarbon, with or without additives, fillers, or aggregates, having sufficient insolubility in water and viscosity to be used advantageously in roofing, sealing, paving, or waterproofing, whether naturally occurring or distilled from petroleum or like products. In particular, asphalt includes, without limitation, straight-run asphalts or asphalts modified by the addition of rubbers or other polymers, coal tar, and pitch, as well as all bitumens and modified bituminous materials, whether oxidized or unoxidized. Bitumens such as asphalt having a softening point of between about 10° C. and about 107° C. (50° F. and about 225° F.) with penetration at 77 degrees F. of about 12 to about 100¹/₁₀ millimeters may be used as is or may be modified by the addition of rubber or other polymers, as for example styrene-ethylene-butylene-styrene (SEBS) block copolymer, styrene-butadiene-styrene (SBS) block copolymer, and atactic polypropylene (APP). An example of a flux asphalt which may be used to great advantage in making either unmodified or rubber- or other polymer-modified asphalts for use with the invention is that sold under the trade designation TOSCO by the U.S. Oil and Refining Company of Tacoma, Wash. One formulation of an SEBS copolymer used with great advantage in this invention is that provided in plasticized form by Imperbel America Corporation of 717 South 38th, P.O. Box 6761, Kansas City, Kans., 66106, under a product designation of I 175.

Preferred cutback agents for use in making compositions according to the invention comprise mineral spirits, including any of the common industrial grade mineral spirits, in particular those having kauri-butanol (k.b.) values of 30 or greater, and flashpoints of 100° F. or greater. In particular, the mineral spirits available commercially from the Exxon Corporation under the trade name Varsol 3139 have been found to work satisfactorily with the cutback asphalts of the invention.

Polybutene means any polymer of isobutene (($CH_3$)$_2$CCH). While polybutenes having average molecular weights of between about 900 and about 2500, viscosities at 100° F. of between about 8,000 and about 150,000 cSt, and densities of between about 7.4 and about 7.6 pounds per gallon (US) are preferred, any polybutene which will accomplish the purposes disclosed herein will serve. An example of a preferred polybutene for use in making the compositions described herein is available under the trade designation PARAMINS PARAPOL 1300 from the Exxon Chemical Company. This polybutene has an average molecular weight of about 1,300, a viscosity at 100° F. of about 27,230 cSt, and a density of about 7.47 pounds per gallon (US). An alternative acceptable polybutene is available under the trade designation INDOPOL H300.

An amine is a derivative of ammonia in which one or more of the hydrogens of ammonia ($NH_3$) is replaced by an alkyl group, e.g., methyl (—$CH_3$), ethyl (—$C_2H_5$), or an aryl group, e.g., phenyl (—$C_6H_5$) or naphthyl (—$C_{10}H_7$). An example of a preferred amine for use in making the compositions described herein is dehydroabietyl amine, which is available under the trade designation HERCULES Amine D from Hercules Incorporated of Wilmington, Del.

A fatty acid is a monobasic organic acid derived from, for example, the saturated series of aliphatic hydrocarbons or from natural fats and oils, and having the general formula $C_nH_{2n+1}COOR$. An example of a compound comprising such acids and suitable for use in making the compositions herein is available under the trade designation MORLIFE, and in particular MORLIFE 3300, from Morton Performance Chemicals of Danvers, Mass.

An example of a colloidal attapulgite clay compound suitable for the uses disclosed herein is that available under the trade designation MIN-U-GEL G35 from ITC Industrials of Quincy, Fla. An active cationic salt suitable for the uses disclosed herein is available under the trade designation PA-14 Acetate from Tomah Products, Inc., of Milton, Wis., and comprises isodecyloxypropyl amine acetate.

An example of diatomaceous earth (also sometimes known as silica, kieselguhr, siliceous earth, ceyssatite, tripolite, and infusorial earth) suitable for use for the purposes disclosed herein is available under the trade designation CELITE, and especially CELITE 522, from the Celite Corporation of Lompoc Calif.

An example of a cellulose filler suitable for use in accomplishing the purposes disclosed herein is that cellulose available under the trade designations GEL-CEL, INTER-FIBE 230, and INTERFIBE 250 from Interfibe of Portage, Mich. Such fibers are available in various average lengths. It is found that the use of a mix of relatively short and relatively long fibers is desireable in tailoring characteristics in the finished cutbacks. The possibilities and appropriate lengths or mixes of lengths for achieving desired characteristics will not trouble one of ordinary skill in the art of making asphalt coatings. A particularly efficacious means for adding cellulose fibers to the compound during mixing has been found to be to load the fibers into a common insulation blower, such as those used in the residential and commercial insulation industries, and to blow it into the mixing tank. This has been found to aid uniform mixing of the fibers and making a more consistent product.

Turning now to the drawing, the invention will be described in a preferred embodiment by reference to the numerals of the drawing figure wherein like numbers indicate like parts.

FIG. 1 is a schematic view of an apparatus for carrying out a preferred process for making fully-oxidized cutback asphalts according to the invention. Apparatus 100 comprises flux holding tank 101; air still 110, which comprises tank 102 and one or more blowers 111; cutback storage tank 103; and mixing tank 104. In a preferred process for making a fully oxidized all-weather hydrophobic cutback asphalt according to the invention a flux asphalt is introduced to air still 110 from storage tank 101. To aid both in handling and oxidation of the asphalt, and in order to increase the rate at which the asphalt oxidizes, it is generally preferable to introduce the asphalt to the storage tank at a somewhat elevated temperature, preferably between about 375° F. and about 425° F., and most preferably about 400° F. In doing so it is advantageous to run the flux asphalt through optional heater or heat exchanger 105.

The flux asphalt is placed in tank 102 of air still 110. One or more blowers 111 are used to blow atmospheric air through the flux asphalt, causing atmospheric oxygen to combine with the asphalt. As the oxidation of asphalt is an exothermic reaction, it is not typically necessary to heat tank 102 of the air still in order to sustain the reaction and complete oxidation of the asphalt. The temperature of the tank ultimately stabilizes at about 500° F. An incidental benefit of oxidizing the asphalt in this manner is that many of the lighter components of the asphalt (the "light ends") are either burned off or otherwise separated from the asphalt due to the elevated temperatures; in many cases they may be removed and used for other purposes or merely burned off. Once the reaction has begun to sustain itself the softening point of the asphalt within the still is tested by drawing some of the asphalt off and allowing it to cool; the temperature of the softening point is easily noted. A preferred process for checking the softening point is detailed in ASTM Standard D36, the contents of which are herein incorporated by reference. As previously noted, oxidation of the asphalt to the point at which it softens at 100° F. or higher is adequate, but best results are acheived by oxidizing the asphalt to a softening point of approximately 120° F.

In the preferred process for preparing the oxidized cutback asphalt of the invention as depicted in FIG. 1, once the asphalt has reached a desired level of oxidization, i.e., a desired softening point, it is transferred, as by means of a pump, to cutback storage tank 103 via pipeline 120. In storage tank 103 the oxidized asphalt is allowed to cool, preferably to about 350° F. or 375° F., and mixed with a cutback agent, preferably mineral spirits as previously discussed. Mineral spirits are introduced to tank 103 from source 107 and mixed at low shear levels until thoroughly mixed by means of mixer 112. In preferred cutbacks according to the invention, a ratio of about 70% by weight asphalt to about 30% by weight mineral spirits is used.

It is often preferred to produced cutback asphalts according to the invention which enjoy the superior qualities of rubber- or other polymer modified asphalt bases, including improved resistance to weather, ultraviolet radiation, ozone, and thermal shock. When producing such modified asphalts according to the process herein described, it is often convenient to combine the modifying rubber or other polymer in cutback storage tank 103, prior to introduction of the cutback agent, at a slightly higher temperature, as for example about 400° F. in the case of SEBS block copolymer as described in the incorporated patent disclosures and as illustrated in Example 2 below. Following blending of the asphalt and the modifying polymer, the asphalt is allowed to cool to 350° F. or 375° F. as discussed, and the process continues as otherwise described.

After the desired proportions of asphalt and cutback agent have been uniformly blended by the low-shear mixer, the cutback mixture is tested to ensure proper solids content by drying or baking a sample of the cutback asphalt in an oven and weighing the residual solids after all the volatile elements have been driven off. Viscosity is also preferably checked, using a Brookfield Viscositer, for a viscosity of 100 to 300 Centipoise at the preferred softening point of 120° F.

As previously mentioned, the cutback asphalt formed at this stage of the process has been found to have higher viscosity at low temperatures, and lower viscosity at high temperatures, than is desirable. Moreover, it is less hydrophobic than is desirable. Therefore the cutback asphalt is transferred to mixing tank 104, where it is allowed to cool to a temperature of about 175° F. to about 225° F., preferably about 200° F., low shear mixer 113 is started, and enough polybutene to make up between about 1% and about 6% by weight of the finished cutback asphalt is added and mixed thoroughly. Enough hydrophobic agent to make up between about ⅛% to about ¾% by weight of the finished cutback asphalt is added and thoroughly mixed. Finally fillers or other additives, such as cellulose fibers, diatomaceous earth, limestone, or asbestos are added, together with enough additional oxidized base asphalt, mineral spirits, and cutback asphalt to achieve a desireable viscosity are added. Preferred compositions have viscosities, when finished, of approximately 40,000 to 90,000 centipoise at 120° F., and approximately 300,000–500,000 at room temperature. When the resultant mix has been thoroughly blended it is removed from the mixing tank and placed in containers for sale, for example in 1, 3, or 5 gallon cans, 11 ounce tubes, and truckloads.

The particular specifications and capacities of the apparatus used in producing cutback asphalts according to the invention will vary, depending upon the amount of cutback to be produced, the manner in which it is to be sold, and desired additives. But the sizing and selection of storage and mixing tanks, mixers, blowers, pumps, valves, etc., will be a matter well within the ability of those having ordinary familiarity with the design, construction, and operation of asphalt plants and requirements. In making quantities of cutback asphalts of the type described suitable for commercial sale, one particularly satisfactory combination has been found to comprise a 25,000 gallon storage tank 101; a 100-ton capacity air still 110 comprising a 25,000 gallon tank 102 and twin WHISPAIR Rotary Lobe Blowers 111, Model No. 852495-20 from the Roots Company of Connersville, Ind., each having a normal rated capacity of 2,800 cubic feet per minute at the required operating pressure; a 20,000 to 30,000 gallon cutback storage tank 103, with a Model 10-SV2S-4 10 h.p. Side Entry Mixer/Agitator 112 manufactured by the Burhans-Sharpe Company of Seattle, Wash., and having a rated speed of 100–300 RPM, installed and operating at about 200 RPM; and a total of 4 1,000 gallon vertical mixing tanks 104, each having a Baldor Super E 15 HP motor 113, model number CEM333T, rated at 1,750 RPM geared down through a SEW-Eurodrive type SF92LP254TC-KS gearbox to between 90 and about 150 RPM, preferably about 120 RPM. This combination permits the production of 4,000 gallon lots, with 4 1,000 batches of fully oxidized hydrophobic cutback asphalt, each optionally containing unique combinations of fillers and other additives.

Figure 2:
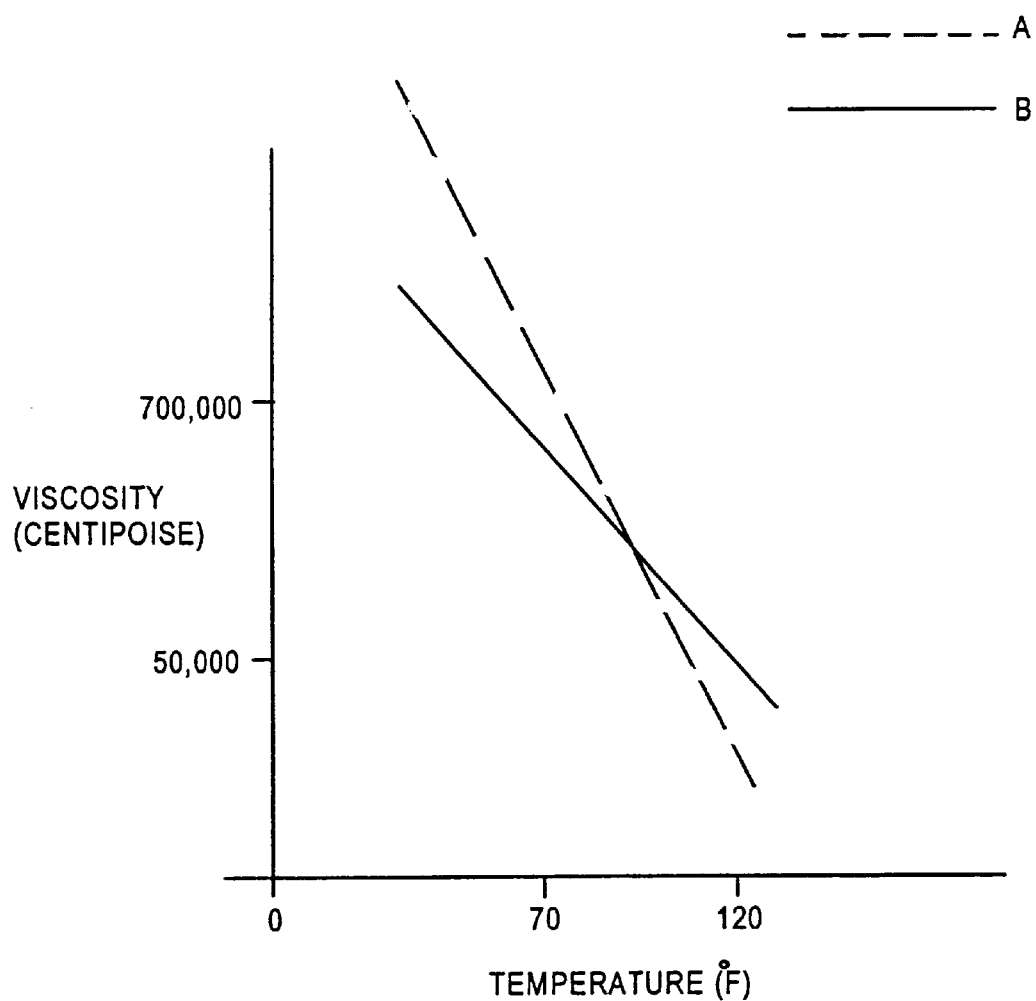
FIG. 2 is a schematic plot of illustrative viscosities of cutback asphalts according to the invention, compared to comparable prior art compositions, as a function of temperature.

FIG. 2 is a schematic plot of representative illustrative viscosities of cutback asphalts according to the invention, compared to comparable prior art compositions, as a function of temperature. Broken line A represents illustrative data for a mineral spirit cutback asphalt comprising 70% by weight fully oxidized asphalt and 30% by weight mineral spirits, with cellulose, diatomaceous earth, and limestone additives according to Example 1 below, but without polybutene or any hydrophobic agent as contemplated in the invention. Unbroken line B represents an identical asphalt according to Example 1 but containing 2% by weight polybutene and significant amounts of an amine compound. It is apparent from a comparison of the two curves that the addition of polybutene and a hydrophilic agent according to the invention has substantial results on the viscosity of the cutback asphalt, both at high and low temperatures: at low temperatures the viscosity is substantially reduced, while at high temperatures viscosity is increased. In both cases the change is beneficial: at low temperatures the cutback asphalt is more readily workable, while at high temperatures the asphalt exhibits much greater resistance to sag and creep than the composition not containing polybutene. It is believed that the greatest contribution to changing the viscosity characteristics of the asphalt, that is, to the effect in the glass transition temperature of the asphalt, is due to the addition of polybutene as discussed.

EXAMPLE 1

A fully-oxidized all-weather hydrophobic cutback mastic is produced using the apparatus described above. Approximately 25,000 gallons of TOSCO brand flux asphalt is oxidized to a softening point of 120° F. by placing it in a 30,000 gallon capacity air still and blowing air through the asphalt at a rate of 5,500 cubic feet per minute for three hours. When it has been established through testing according to the standards of ASTM D36 that a 120° F. softening point has been attained, 140,000 pounds of the asphalt are pumped to a 30,000 gallon capacity vertical mixing tank and allowed to cool to between 350° F. and 375° F. 60,000 pounds of VARSOL brand mineral spirits are added to the tank and blended with the asphalt at 200 RPM using a Burhans-Sharpe Model 10-SV2S-4 10 h.p. Side Entry Mixer/Agitator for two hours to make approximately 25,000 gallons of thoroughly mixed, fully oxidized mineral spirit cutback asphalt comprising 30% mineral spirits and 70% asphalt by weight. The solids content is checked and viscosity is checked for a value of 200 centipoise at 120° F. The cutback asphalt is allowed to cool to under 200° F., and 400 gallons of the asphalt is transferred to a 1,000 gallon capacity vertical mixing tank. The asphalt is agitated at low speed, approximately 50 RPM, and 10 gallons of PA-14 Acetate active cationic salt is added and allowed to disperse within the asphalt mixture for five minutes, at which point 550 pounds of MIN-U-GEL G35 colloidal attapulgite clay compound is added. This mixture is allowed to blend for 15 minutes. During this period the viscosity increases noticeably, primarily due to the presence of the clay. Twenty gallons of Parapol 1300 polybutene is then added and allowed to disperse thoroughly. An additional 100 gallons of cutback asphalt is added from the cutback storage tank to thin the mixture slightly, and allowed to blend until a uniform consistency is acquired. Two hundred pounds of Interfibe 230 cellulose filler are added by means of an insulation blower as described above, and mixed until a uniform consistency results. Another 100 gallons of cutback is added, to thin the mix, and mixed until uniform. Three gallons of HERCULES Amine D is added as a hydrophobic agent and mixed thoroughly, and 250 pounds of Interfibe JMM cellulose fibers are added. When the mix is again uniform 400 pounds of Celite 522 diatomaceous earth and 100 pounds of limestone are added, followed by another 200 gallons of cutback. The resultant compound is mixed for 30 minutes to insure a uniform blend. To ensure uniformity the mixer is set up to create a top-to-bottom circulation within the tank. Samples are taken to ensure a viscosity of 40,000 to 60,000 centipoise at 120° F. and of 300,000 to 400,000 centipoise at room temperature.

Approximately 900 gallons of fully oxidized all-weather hydrophobic cutback asphalt capable of being applied to a substrate at an ambient temperature as low as approximately 20° F. without being heated, and exhibiting improved adherence to a wet substrate results. The compound is packed in 1 gallon, 3 gallon and 5 gallon cans, 11 ounce tubes, and truck tanks for use. It may be used for general membrane patching, sealing, roofing, and waterproofing.

EXAMPLE 2

A fully-oxidized SEBS-modified all-weather hydrophobic cutback mastic is produced using the apparatus described above. Approximately 25,000 gallons of TOSCO brand flux asphalt is oxidized to a softening point of 120° F. by placing it in a 30,000 gallon capacity air still and blowing air through the asphalt at a rate of 5,500 cubic feet per minute for three hours. When it has been established through testing according to the standards of ASTM D36 that a 120° F. softening point has been attained, the asphalt is allowed to cool to approximately 400° F. Five thousand six hundred (5600) pounds of Imperbel I 175 gelled bricks of plasticized SEBS compound are placed in a 30,000 gallon capacity vertical mixing tank, and 134,400 of the 400° F. oxidized asphalt are added; these are mixed for approximately 30 minutes until a uniform polymer modified asphalt results. The polymer modified asphalt is allowed to cool to between 350° F. and 375° F., and 60,000 pounds of VARSOL brand mineral spirits are added to the tank and blended with the modified asphalt at 200 RPM using a Burhans-Sharpe Model 10-SV2S-4 10 h.p. Side Entry Mixer/Agitator as described above for two hours to make approximately 25,000 gallons of thoroughly mixed, fully oxidized mineral spirit cutback asphalt comprising 30% mineral spirits and 70% polymer-modified asphalt by weight. The solids content is checked and viscosity is checked for a value of 100 to 300 centipoise at 120° F. The modified cutback asphalt is allowed to cool to under 200° F., and 400 gallons of the asphalt is transferred to a 1,000 gallon capacity vertical mixing tank. The asphalt is agitated at low speed, approximately 50 RPM and 10 gallons of PA-14 Acetate active cationic salt is added and allowed to disperse within the asphalt mixture for five minutes, at which point 600 pounds of MIN-U-GEL G35 colloidal attapulgite clay compound is added. This mixture is allowed to blend for 15 minutes. During this period the viscosity increases noticeably, primarily due to the presence of the clay. Twenty gallons of Parapol 1300 polybutene is then added and allowed to disperse thoroughly. An additional 100 gallons of cutback asphalt is added from the cutback storage tank to thin the mixture slightly, and allowed to blend until a uniform consistency is acquired. Two hundred pounds of Interfibe 230 cellulose filler are added by means of an insulation blower as described above, and mixed until a uniform consistency results. Another 100 gallons of cutback is added, to thin the mix, and mixed until uniform. Five gallons of Morton MORLIFE 3300 are added as a hydrophobic agent and mixed thoroughly, and 250 pounds of Interfibe JMM cellulose fibers are added. When the mix is again uniform 400 pounds of Celite 522 diatomaceous earth, followed by another 200 gallons of cutback. The resultant compound is mixed for 30 minutes to insure a uniform blend. To ensure uniformity the mixer is set up to create a top-to-bottom circulation within the tank. Samples are taken to ensure a viscosity of 40,000 to 60,000 centipoise at 120° F. and of 300,000 to 400,000 centipoise at room temperature.

Approximately 900 gallons of fully oxidized polymer-modified all-weather hydrophobic cutback asphalt capable of being applied to a substrate at an ambient temperature as low as approximately 20° F. without being heated, and exhibiting improved adherence to a wet substrate and superior resistance to weathering and exposure to ultraviolet rays and ozone results. The compound is packed in 1 gallon, 3 gallon and 5 gallon cans, 11 ounce tubes, and truck tanks for use. It may be used for general membrane patching, sealing, roofing, and waterproofing.

EXAMPLE 3

A fully-oxidized all-weather hydrophobic cutback mastic is produced using the apparatus described above. Approximately 25,000 gallons of TOSCO brand flux asphalt is oxidized to a softening point of 120° F. by placing it in a 30,000 gallon capacity air still and blowing air through the asphalt at a rate of 5,500 cubic feet per minute for three hours. When it has been established through testing according to the standards of ASTM D36 that a 120° F. softening point has been attained, 140,000 pounds of the asphalt are pumped to a 30,000 gallon capacity vertical mixing tank and allowed to cool to between 350° F. and 375° F. 60,000 pounds of VARSOL brand mineral spirits are added to the tank and blended with the asphalt at 200 RPM using a Burhans-Sharpe Model 10-SV2S-4 10 h.p. Side Entry Mixer/Agitator for two hours to make approximately 25,000 gallons of thoroughly mixed, fully oxidized mineral spirit cutback asphalt comprising 30% mineral spirits and 70% asphalt by weight. The solids content is checked and viscosity is checked for a value of 200 centipoise at 120° F. The cutback asphalt is allowed to cool to under 200° F., and 500 gallons of the asphalt is transferred to a 1,000 gallon capacity vertical mixing tank. Six hundred pounds of asbestos fiber and 800 pounds of limestone are added, in alternating portions of approximately 100 pounds, and observing accepted standards for safety and mining exposure to the asbestos, with 5 gallons of Morton MORLIE 3300, 30 gallons of Parapol 1300 polybutene, and 300 pounds of Celite 522 diatomaceous earth Once all the components have been added the mixture is blended for 10 minutes, until a uniform distribution has been accomplished, and 60 gallons of VARSOL mineral spirits are added. This mixture is blended another five minutes, and 300 gallons of cutback asphalt are added. After a uniform distribution has been ensured by 30 minutes of mixing, the compound is processed via a Siefer Trigonal model no. SM 290/HK colloidal mill (available from Siefer Maschinenfabrik GmbH and Co. K.G. through Siefer America Inc.) to ensure full breakdown and incorporation of the asbestos fibers. Samples are taken to ensure a viscosity of 60,000 to 90,000 centipoise at 120° F. and of 400,000 to 600,000 centipoise at room temperature.

Approximately 900 gallons of fully oxidized all-weather hydrophobic cutback asphalt capable of being applied to a substrate at an ambient temperature as low as approximately 20° F. without being heated, and exhibiting improved adherence to wet substrates and enhanced thermal insulation qualities results. The compound is packed in 1 gallon, 3 gallon and 5 gallon cans, 11 ounce tubes, and truck tanks for use. It may be used for general membrane patching, sealing, roofing, and waterproofing.

Relative proportions of the components of the compounds described in the Examples, given as parts and percentages by weight, are shown in Table 1.

| Ingredient | Example 1 Parts | Example 1 % | Example 2 Parts | Example 2 % | Example 3 Parts | Example 3 % |
|---|---|---|---|---|---|---|
| Cutback asphalt | 5840 | 76.9 | 5840[a] | 77.2 | 5840 | 70.8 |
| Active cationic salt | 77.4 | 1.0 | 77.4 | 1.0 | — | — |
| Colloidal attapulgite clay | 550 | 7.9 | 600 | 7.9 | — | — |
| Polybutene | 150 | 2.0 | 150 | 2.0 | 225 | 2.7 |
| Cellulose fiber filler | 450 | 5.9 | 450 | 6.0 | — | — |
| Amine compound | 25 | 0.3 | — | — | — | — |
| Fatty acid compound | — | — | 44 | 0.6 | 44 | 0.5 |
| Diatomaceous earth filler | 400 | 5.3 | 400 | 5.3 | 300 | 3.6 |
| Limestone filler | 100 | 1.3 | — | — | 800 | 9.7 |
| Asbestos | — | — | — | — | 600 | 7.3 |
| Additional pure mineral spirits | — | — | — | — | 440 | 5.3 |
| Totals | 7592 | 100[b] | 7561 | 100[b] | 8249 | 100[b] |

[a] SEBS polymer-modified cutback asphalt.
[b] Numbers may not add to 100 due to rounding.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability in the roofing, waterproofing, and sealing industries. In particular, the invention represents an advance in the usefulness, effectiveness, ease of installation, durability, weather resistance, and resistance to ultraviolet rays and ozone of mineral spirit cutback asphalt-based roofing, sealing, and waterproofing compounds.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A fully oxidized all-weather hydrophobic cutback asphalt capable of being spread upon a substrate at an ambient temperature as low as approximately 20° F. without being heated, and exhibiting improved adherence to a wet substrate, the cutback asphalt comprising:

between about 60% and about 80% by weight fully oxidized asphalt having a softening point between about 110° F. and 140° F.;

between about 20% and about 40% by weight mineral spirits;

between about 1% and about 6% by weight polybutene;

and at least about ⅙% by weight of a hydrophobic agent selected from the group consisting of fatty acids and amine compounds.

2. The cutback asphalt of claim 1, further comprising at least approximately 1% by weight polymer modifier.

3. The cutback asphalt of claim 1, further comprising fillers selected from the group consisting of cellulose fibers, diatomaceous earth, limestone, and asbestos.

4. The cutback asphalt of claim 2, further comprising fillers selected from the group consisting of cellulose fibers, diatomaceous earth, limestone, and asbestos.

5. The cutback asphalt of claim 1, further comprising cellulose fibers as fillers; and a colloidal attapulgite clay gelling compound, whereby suspension of the cellulose fibers in the cutback asphalt is improved.

6. The cutback asphalt of claim 5, further comprising an active cationic salt surfactant, whereby dispersion of said colloidal attapulgite clay in said cutback asphalt is improved.

7. The cutback asphalt of claim 2, further comprising cellulose fibers as fillers; and a colloidal attapulgite clay gelling compound, whereby suspension of the cellulose fibers in the cutback asphalt is improved.

8. The cutback asphalt of claim 7, further comprising an active cationic salt surfactant, whereby dispersion of said colloidal attapulgite clay in said cutback asphalt is improved.

9. A fully oxidized cutback asphalt comprising:

between about 60% and about 80% by weight fully oxidized asphalt having a softening point between about 110° F. and 140° F.;

between about 20% and about 40% by weight mineral spirits; and at least ½% polybutene, whereby a glass transition temperature of the cutback asphalt may be controlled such that a cutback asphalt results which is capable of being spread upon a substrate at an ambient temperature as low as approximately 20° F.

10. The cutback asphalt of claim 9, comprising between about 1% and about 6% by weight polybutene.

11. The cutback asphalt of claim 10, comprising between about 2% and about 3% by weight polybutene.

12. The cutback asphalt of claim 9, further comprising fillers selected from the group consisting of cellulose fibers, diatomaceous earth, limestone, and asbestos.

13. The cutback asphalt of claim 9, further comprising cellulose fibers as fillers; and a colloidal attapulgite clay gelling compound, whereby suspension of the cellulose fibers in the cutback asphalt is improved.

14. The cutback asphalt of claim 13, further comprising an active cationic salt surfactant, whereby dispersion of said colloidal attapulgite clay in said cutback asphalt is improved.

15. A fully-oxidized cutback asphalt comprising:

between about 60% and about 80% by weight fully oxidized asphalt having a softening point between about 110° F. and 140° F.;

between about 20% and about 40% by weight mineral spirits; and at least ⅙% of a hydrophobic agent selected from the group comprising fatty acids and amine compounds, whereby adherence of the asphalt-based coating to a wet substrate is improved.

16. A polymer-modified fully-oxidized all-weather mineral-spirit cutback asphalt comprising:

between about 60% and about 80% by weight fully oxidized asphalt having a softening point between about 110° F. and 140° F.;

between about 20% and about 40% by weight mineral spirits;

at least approximately 1% by weight polymer modifier, and at least ½% of polybutene, whereby a glass transition temperature of the cutback asphalt may be controlled such that a cutback asphalt results which is capable of being spread upon a substrate at an ambient temperature as low as approximately 20° F.

17. The polymer-modified cutback asphalt of claim 16, comprising between about 1% and about 6% by weight polybutene.

18. The polymer-modified cutback asphalt of claim 17, comprising between about 2% and about 3% by weight polybutene.

19. The polymer-modified cutback asphalt of claim 1, further comprising fillers selected from the group consisting of cellulose fibers, diatomaceous earth, limestone, and asbestos.

20. The polymer-modified cutback asphalt of claim 1, further comprising at least ⅙% of a hydrophobic agent selected from the group consisting of fatty acids and amine compounds, whereby an asphalt-based coating results which is capable of adhering to a wet substrate.

21. The polymer-modified cutback asphalt of claim 20, comprising at least about ⅙% by of the hydrophobic agent.

* * * * *

UNITED STATES PATENT AND TRADEMARK OFFICE
CERTIFICATE OF CORRECTION

PATENT NO. : 6,087,419
DATED : July 11, 2000
INVENTOR(S) : John R. Fields

Page 1 of 1

It is certified that error appears in the above-identified patent and that said Letters Patent is hereby corrected as shown below:

<u>Column 14, claim 19 and 20</u>
Line 1, change "1" to "17".

Signed and Sealed this

Twenty-eighth Day of August, 2001

*Attest:*

NICHOLAS P. GODICI
*Attesting Officer*     *Acting Director of the United States Patent and Trademark Office*